US012524644B2

United States Patent
Mukherjee et al.

(10) Patent No.: US 12,524,644 B2
(45) Date of Patent: Jan. 13, 2026

(54) RADIO FREQUENCY IDENTIFICATION DEVICE TAG OPERABLE UNDER INDUCTION CAP SEALING ARRANGEMENT

(71) Applicants: Somnath Mukherjee, Milpitas, CA (US); Ashis Kumar Khan, San Jose, CA (US)

(72) Inventors: Somnath Mukherjee, Milpitas, CA (US); Ashis Kumar Khan, San Jose, CA (US)

( * ) Notice: Subject to any disclaimer, the term of this patent is extended or adjusted under 35 U.S.C. 154(b) by 0 days.

(21) Appl. No.: 18/615,640

(22) Filed: Mar. 25, 2024

(65) Prior Publication Data
US 2024/0362452 A1    Oct. 31, 2024

Related U.S. Application Data

(60) Provisional application No. 63/577,113, filed on Apr. 3, 2023.

(51) Int. Cl.
*G06K 19/077*    (2006.01)
(52) U.S. Cl.
CPC . *G06K 19/07779* (2013.01); *G06K 19/07775* (2013.01)
(58) Field of Classification Search
CPC ....... G06K 19/07779; G06K 19/07775; G06K 19/0726; G06K 19/07749; G06K 19/07771
See application file for complete search history.

(56) References Cited

U.S. PATENT DOCUMENTS

| | | | |
|---|---|---|---|
| 2003/0112143 A1* | 6/2003 | Serra | G06K 19/07783 340/572.7 |
| 2007/0095926 A1* | 5/2007 | Zhu | G06K 19/07767 235/492 |
| 2009/0009415 A1* | 1/2009 | Tanska | H01Q 7/08 343/742 |
| 2014/0209691 A1* | 7/2014 | Finn | H01F 27/363 235/492 |

* cited by examiner

*Primary Examiner* — Sonji N Johnson
(74) *Attorney, Agent, or Firm* — MASUVALLEY & PARTNERS; Peter Martinez

(57) ABSTRACT

A Radio Frequency Identification Device (RFID) tag capable of withstanding electrical stress from induction sealing arrangement and provide shielding against the metallic seal required for induction sealing includes an antenna coil partitioned into a main coil and an auxiliary coil. Both the coils are collocated on two separate overlapping or non-overlapping regions of a dielectric substrate without any galvanic connection therebetween. The main coil is operatively connected with semiconductor chip on the dielectric substrate for necessary RFID activities, while the auxiliary coil operates as a resonator tuned to a certain resonating frequency that enables the auxiliary coil to act as a virtual open circuit to induction sealing frequency and help the semiconductor chip to withstand the electrical stress from induction sealing. The auxiliary coil carries a current during interrogation of the tag by an RFID Reader which provides shielding against eddy currents on the metal seal for induction sealing.

14 Claims, 13 Drawing Sheets

Top View

Side View

Surface current on metal disk

Current through Auxiliary coil

Number of Turns in Auxiliary coil

Frequency MHz

RADIO FREQUENCY IDENTIFICATION DEVICE TAG OPERABLE UNDER INDUCTION CAP SEALING ARRANGEMENT

FIELD OF THE INVENTION

This invention relates to an improved Radio Frequency Identification Device (RFID) tag. More specifically, the present invention is directed to provide a mechanism for a high-frequency (HF) RFID tag to correctly operate in an arrangement where an induction sealing machine seals a metal foil embedding the improved RFID tag on the container mouth so that the improved RFID chip can safely withstand electrical stress related to such induction sealing arrangement and also compensate for the read-range reduction in the presence of metal foil.

BACKGROUND OF THE INVENTION

Consumable items like medication, food and beverage items, beauty products, automotive etc. housed inside plastic or glass containers are invariably provided with a proper seal to ensure no leaks, detect evidence of tampering and prolonged shelf life, thereby symbolizing quality and safety. Online retailers are also being encouraged to use induction seal by couriers and e-commerce websites.

The preferred method of sealing is Induction Cap Sealing that dictates the use of a liner covering the mouth of the container. The liner consists of multiple layers of a pulp board, wax, metallic (usually Aluminum) foil and polymer. The Induction sealing apparatus generates a strong time-varying (nominally sinusoidal) magnetic field that can penetrate the plastic or glass container and generate eddy currents on the metallic foil in the liner. The heat generated in the foil melts the low melting point wax-like substance applied to the periphery of the foil. Once the magnetic field from the Induction sealing apparatus is removed, the wax-like substance freezes again to create a hermetic seal ensuring the package is airtight and tamper-proof.

There is a motivation to put NFC tags inside such containers (e.g. bottles, vials) of consumable items so that the consumer can verify its authenticity and also gather useful information about the products. These containers are usually made from low cost plastic material (or glass) and would normally allow a HF RFID tag located inside to be read by a reader such as smart phone. However, using Induction Cap Sealing creates obstacles to such tags being read.

There are two modes of failure for an HF RFID tag when it has to operate in the Induction Sealing ecosystem.
1. The voltage induced in the antenna coil during induction sealing may exceed the safe working limit of the semiconductor chip.
2. The metallic sealing foil, located close to the RFID, generates eddy currents when interrogation by an RFID reader takes place, and hinders the proper performance of the RFID tag.

What is needed is a solution that does not require additional costs over a conventional antenna design (i.e. without using any shielding material like ferrite) and still provide acceptable performance to be read in the Induction sealing ecosystem, and the present invention provides all the said features.

OBJECT OF THE INVENTION

It is thus a basic object of the present invention to develop a High Frequency (HF) RFID tag operable under the induction sealing arrangement and withstand voltage induced in antenna coil of the tag during the said induction sealing arrangement.

Another object of the present invention is to develop a High Frequency (HF) RFID tag operable under the induction sealing arrangement and withstand eddy current generated by metallic sealing foil, located close to the tag when interrogation by an RFID reader takes place without hindering proper performance of the RFID tag.

Yet another object of the present invention is to develop a High Frequency (HF) RFID tag operable under the induction sealing arrangement without using additional components over a conventional antenna design and still provide enhanced performance to be read in the Induction sealing ecosystem.

SUMMARY OF THE INVENTION

Thus, according to the basic aspect, there is provided a Radio Frequency Identification Device (RFID) tag capable of withstanding electrical stress from induction sealing arrangement and at the same provide shielding against the metallic seal required for induction sealing, comprising at least an antenna coil partitioned into at least a main coil and an auxiliary coil. Both the coils are collocated on two separate overlapping or non-overlapping regions of a dielectric substrate without any galvanic connection there between. The main coil is operatively connected with semiconductor chip disposed on said dielectric substrate for necessary RFID activities, while the auxiliary coil operates as a resonator tuned to a certain frequency to provide shielding against the deleterious effect of the metal seal required for induction sealing.

In a preferred embodiment of the present RFID tag, the antenna coil is a planar or a non-planar coil and is preferably located within the cavity of cap of a container between wad and inside of the cap before induction heating-based sealing.

In a preferred embodiment of the present RFID tag, a magnetic field generated by induction sealer during the induction heating based sealing induces voltage in the main coil across its terminals, and by limiting area and number of turns in the main coil, the voltage induced between terminals is maintained within safe limits for operation of the semiconductor chip, whereby the magnetic field also induces voltage in the auxiliary coil which is connected to a lumped or distributed capacitor for forming the resonator, said resonator resonates in vicinity of RFID reader operating frequency and therefore acts as a virtual open circuit to induction sealing frequencies resulting negligible current flows in the auxiliary coil during the induction sealing process.

In a preferred embodiment of the present RFID tag, during interrogation by an RFID Reader, appreciable current flows through the auxiliary coil in opposite phase to the unwanted eddy currents flowing through the metal seal. In the vicinity of resonance, the magnetic flux generated by the auxiliary coil exceeds that due to eddy currents in the metal seal. As a result, the auxiliary coil works as a shield against the deleterious effects of eddy current in the metal seal to improve read range.

In a preferred embodiment of the present RFID tag, the auxiliary coil and the main coil are magnetically coupled, whereby resonances of the composite antenna comprising of both the auxiliary coil and the main coil undergo spectral splitting which results in a lower resonance frequency which is lower than standalone resonant frequency of the auxiliary coil, while upper resonance frequency becomes higher than standalone resonant frequency of the main coil, and once the composite antenna is brought in presence of metal foil, both the resonant frequencies move up due to flow of eddy currents and reduction in magnetic flux. Furthermore, the magnetic flux due auxiliary coil gets magnetically coupled to the main coil to deliver larger power to the semiconductor chip compared to that the main coil acting by itself. These factors viz. shielding against metal and assistance from the auxiliary coil to deliver additional energy to the semiconductor chip in the main coil results in improved read range.

In a preferred embodiment of the present RFID tag, geometries of the main coil and the auxiliary coil, and their relative disposition is so designed that the lower resonance is close to operating frequency of the RFID Reader (e.g. smart phone).

In a preferred embodiment of the present RFID tag, the antenna coil is constructed as metal coil deposited on or etched away from the dielectric substrate as a top layer and a bottom layer;
  wherein said top layer consists of two spirals, a smaller inner spiral and a larger outer spiral, which are not connected electrically but configured to be coupled magnetically when current is flowing through them;
  wherein the semiconductor chip is connected to terminals of the smaller inner spiral by utilizing vias and a trace in the bottom layer, whereby said smaller inner spiral and elements connected to that smaller inner spiral constitute the main coil;
  wherein the larger outer spiral includes an open terminal and other terminal is connected to a via that connects to an annular structure in the bottom layer, said annular structure is not electrically closed to prevent flow of local eddy currents, which is ensured by a gap, and thus there exists a parasitic capacitance between larger outer spiral and the annular structure that makes the composite structure work as the electrical resonator, whereby the larger outer spiral and elements connected to that larger outer spiral constitute the auxiliary coil.

In a preferred embodiment of the present RFID tag, the resonant frequency of the resonator by itself is designed to be lower than operating frequency of RFID Reader, and the smaller inner spiral in conjunction with capacitance of the semiconductor chip resonate at a frequency in the proximity of the operating frequency of the RFID Reader.

In a preferred embodiment of the present RFID tag, the annular structure occupies both the top and the bottom layers, whereby another annular structure induces additional parasitic capacitance which that makes composite structure consisting of the auxiliary coil, the annular structure and the another annular structure to work as an electrical resonator.

In a preferred embodiment of the present RFID tag, the auxiliary coil includes cross-connected open circuited transmission line possessing non-uniform characteristic impedance and the main coil is implied.

In a preferred embodiment of the present RFID tag, two metal layers are deposited on or etched away from the dielectric substrate, whereby one of the metal layers is designated as top layer whereas other of the metal layers is designated as the bottom layer;
  wherein a planar first spiral is situated in the top layer whereas another second spiral is situated in the bottom layer;
  wherein the first and the second spirals are identical except in region around via that helps to cross-connect the composite transmission line;
  wherein relatively wide conductors in the top and bottom layers constitute the transmission line with relatively low characteristic impedance;
  wherein relatively narrow conductors in the top and bottom layers constitute the transmission line with relatively high characteristic impedance.

In a preferred embodiment of the present RFID tag, the spirals can be aligned perfectly but can be offset as well.

In a preferred embodiment, the present RFID tag can be used as a shield against presence of metal in its vicinity irrespective of use in induction sealing or not.

In a preferred embodiment, the Auxiliary coil can be used in conjunction with a RFID Reader antenna operating in proximity to metal, to extend the read range of the Reader.

DETAILED DESCRIPTION OF THE INVENTION

Figure 1:
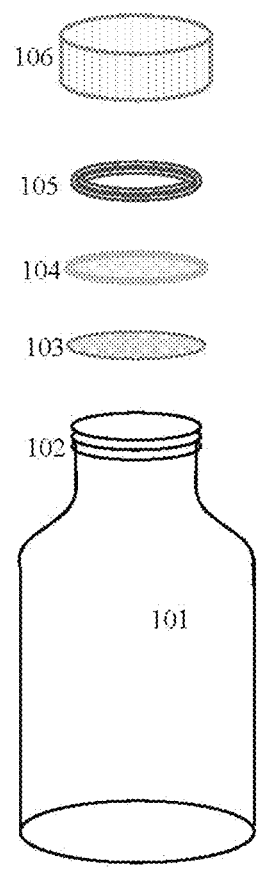
FIG. 1 depicts an exploded view of a typical container that is a candidate for housing an RFID and is sealed using Induction Sealing apparatus.

FIG. 1 shows an exploded view of typical container 101, constructed from an electrically non-conducting material like plastic, glass etc. to house contents such as medicine, food, beauty products etc. The neck 102 of the container is usually threaded for inserting a cap 106 also made of electrically non-conducting material like plastic. To make the container tamper resistant, a seal liner 103 is applied after contents are introduced. The seal liner is constructed from layers of pulp board, wax, metallic (usually Aluminum) foil, with the wax-like material applied at the periphery. The wax-like material has relatively low melting point that melts with moderate increase of temperature. There is often a wad 104 constructed of electrically non-conducting material like foam that sits atop the seal 103.

To seal the container, contents are introduced in 101, then seal 103, wad 104 are applied, and cap 106 is closed. Next an induction sealing apparatus is brought close to cap 106 that generates a strong quasi-sinusoidal magnetic field typically at a frequency of tens of KHz. This magnetic field generates eddy currents on the metallic foil of the seal 103 and heats it up. As a result, the wax-like material melts and adheres to the periphery of the seal 103. When the magnetic field is removed, the temperature of seal 103 falls and the wax-like material freezes back to solid state, creating a hermetic seal.

The preferred location of a HF RFID tag 105 is the cavity of the cap 106, i.e. between wad 104 and inside of cap 106. The RFID 105 encounters following problems when being interrogated by a reader (e.g. a smart phone).
1. Eddy currents in the metallic foil in the seal liner 103 waste useful power from the Reader and also cause severe mistuning of the RFID tag 105.
2. During the operation of sealing, the induction sealing apparatus introduces a significantly large voltage in the RFID antenna that may be sufficient to destroy the front-end of the semiconductor chip in the RFID.

Figure 2A:
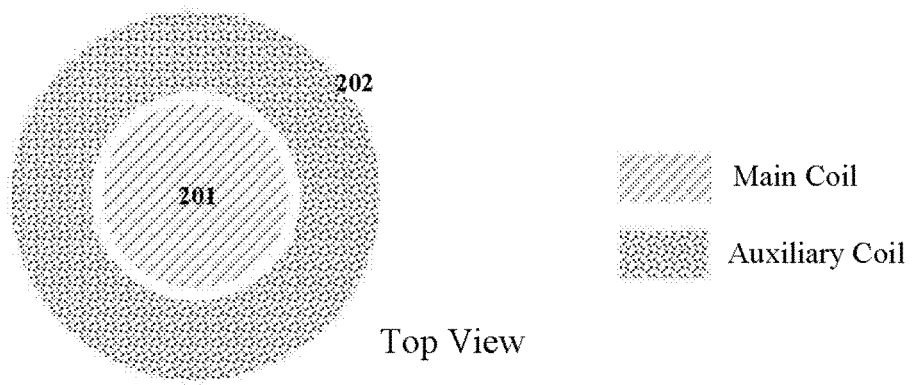
FIGS. 2A and 2B depicts a top view of the partition of antenna coil into Main and Auxiliary coils, and a side view of the partition of antenna coil into Main and Auxiliary coils, respectively.
Figure 2B:
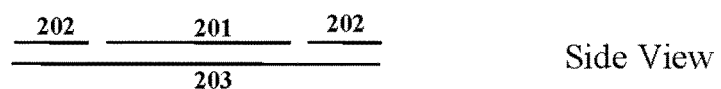

To alleviate the above problems, in the present invention antenna coil of the RFID tag is partitioned into two regions 201 and 202 as shown in FIGS. 2A and 2B. One part (201) is called the Main Coil as the semiconductor chip for necessary RFID activities is located there. The other part (202) is called the Auxiliary Coil and is essentially a resonator tuned to a certain frequency. The partitioning depicted in FIG. 2A (top view) and FIG. 2B (side view) is for illustration only and can take various other forms, e.g., Main Coil being in the outer periphery with the Auxiliary Coil in the inner region. The regions need not be concentric as shown and can even be located in different planes. There is no galvanic connection between the Main Coil and Auxiliary Coil, the coupling being entirely due to magnetic field. The side view (FIG. 2B) also depicts the position of the metal (203). It is to be noted that FIG. 2A and FIG. 2B are not scale drawings and are for illustration only.

During the induction sealing process, both Main and Auxiliary coils develop an induced voltage because of the impinging magnetic field. However, because of the partitioning, the voltage in each region is substantially less than the scenario employing a single coil as in most HF RFID devices. The induced voltage depends on the area of the coil and number of turns, and for the particular example of circular coils varies as the square of radius. In other words, merely halving the radius of a coil cuts down the induced voltage by a factor of four in case of a circular coil. The area and number of turns in the Main Coil can therefore be limited by design so as to keep the induced voltage within safe limits of the semiconductor chip.

Figure 3:
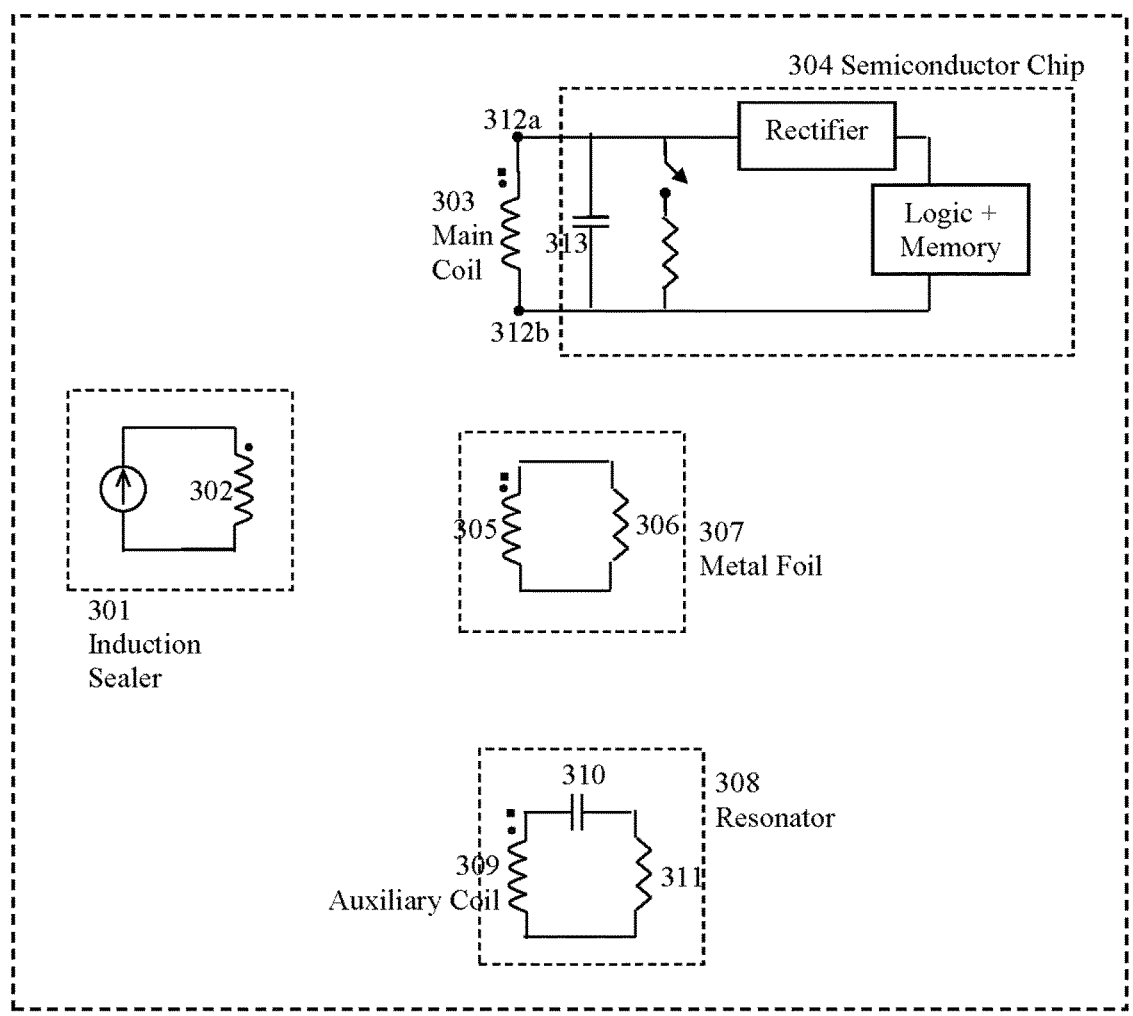
FIG. 3 depicts the equivalent circuit during Induction Sealing process.

FIG. 3 shows the equivalent circuit during the induction sealing process. The Induction Sealer 301 generates a magnetic field in a coil 302 that induces voltage in the Metal Foil 307 of the seal liner 103 and therefore creates eddy currents generating heat. The Metal Foil 307 is modeled by an inductor 305 in series with a resistor 306. The magnetic field generated in 302 also induces voltage in the Main Coil 303 across its terminals 312a and 312b. By limiting the area and number of turns in Main Coil 303, the voltage induced between terminals 312a and 312b is maintained within safe limits for the operation of the Semiconductor Chip 304. Breakdown is thus avoided in 304, and negligible current flows through 303 and 304 during induction sealing as the frequency used for induction sealing is significantly lower than that of the resonant frequency of the Main Coil 303 in conjunction with the capacitor 313.

The magnetic field generated in coil 302 also induces voltage in the Auxiliary Coil 309. Auxiliary Coil 309 is connected to a capacitor 310 (lumped or distributed or a combination of both) forming a Resonator 308. Incidental losses in Auxiliary Coil 309 are modeled by resistor 311. The Resonator 308 resonates in the vicinity of the RFID Reader operating frequency and therefore acts as a virtual open circuit to Induction Sealing frequencies. As a result, negligible current flows in the Auxiliary Coil 309 during the induction sealing process. In other words, both Main Coil 303 and Auxiliary Coil 309 act transparent during induction sealing, and a majority of the energy from Induction Sealer 301 is transferred to Metal Foil 307 to generate heat while keeping the Semiconductor Chip 304 intact. It is to be noted that the Main Coil 303, Auxiliary Coil 309 and Metal Foil 307 are all coupled magnetically as indicated by the square dots.

Figure 4:
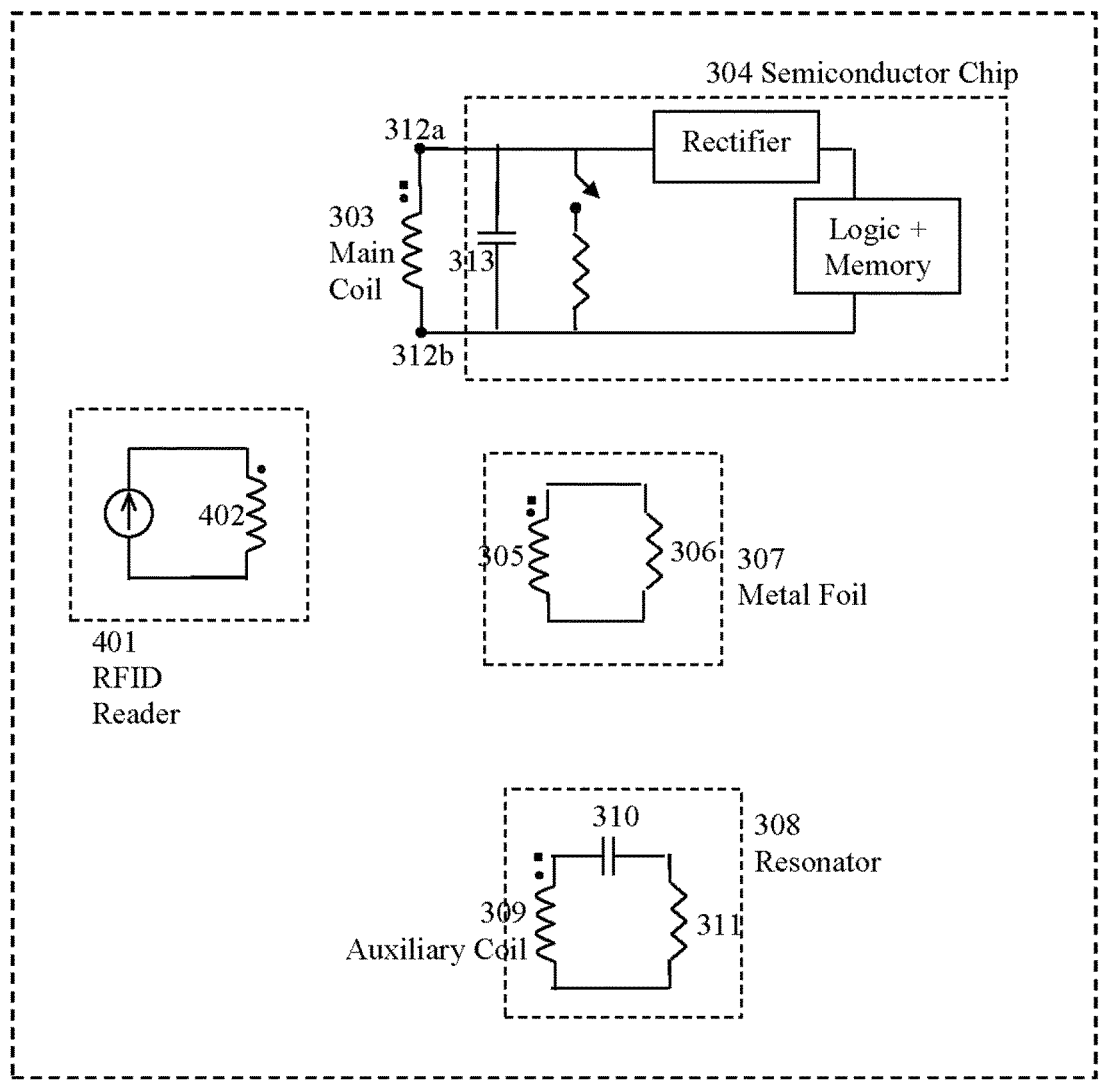
FIG. 4 depicts the equivalent circuit during RFID reading process.

FIG. 4 shows the equivalent circuit during the process of RFID is being interrogated by a RFID Reader 401. When the RFID is being interrogated by an RFID reader, the Main Coil 303 develops an induced voltage to be converted to DC for powering the RFID semiconductor chip 304, as well as downstream (Reader to RFID) communication. The Main Coil 303 also participates during the upstream (RFID to Reader) communication using load modulation. However, due to the limited area of the Main Coil 303, the read range may not always be adequate, and this is where the Auxiliary coil 309 comes into assistance. The magnetic field generated by the inductor coil 402 in Reader 401 induces voltage not only in the Main Coil 303, but also in the Auxiliary coil 309. Being tuned to close to the operating frequency, appreciable current flows through the components Auxiliary coil 309, capacitor 310 and resistor 311 comprising the Resonator 308, and the magnetic field generated in 309 couples to Main Coil 303 synergistically with that directly from the Reader coil 402. This is possible when the magnetically coupled circuits 303 and 309 operate in the so-called 'Odd Mode'. As a result, the total transfer of power to semiconductor chip 304 becomes more than that had 303 acted alone without the Resonator. This enhanced transfer of power also assists in increasing load modulation in the upstream direction.

The Resonator 308 provides another very important function, viz. shielding the RFID from the effect of the Metal Foil 307 lying in the proximity of the RFID as explained below.

Figure 5A:
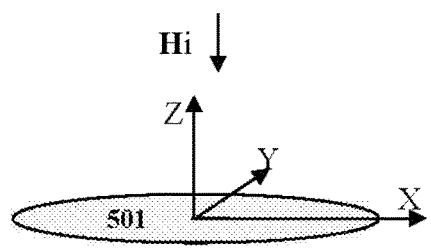
FIG. 5A shows a magnetic field incident on a circular metal disk.
Figure 5B:
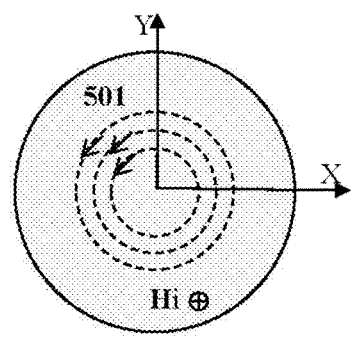
FIG. 5B shows Surface (eddy) currents on the circular metal disk.

Let us consider for the moment a uniform magnetic field of angular frequency $\omega$ expressed as $\vec{H}_i = H_0 \exp(j\omega t) \, \hat{z}$ is incident on a circular metal disk of radius a (501) as shown in FIG. 5A. The time-varying magnetic field creates electric field in concentric circles resulting in surface (eddy) currents as shown in the top view of FIG. 5B, which in turn generates magnetic field in opposition to the incident field $\vec{H}_i$. A reduction in the total magnetic field therefore adversely affects the performance of an RFID device in the vicinity of the metal disk. If σ=conductivity and δ=skin depth of the material of the disk at the operating frequency, the intrinsic surface impedance (ohm) along an annular region of radius r and width Δr is given by $$\frac{(1+j)}{\sigma\delta}\frac{2\pi r}{\Delta r} \quad (1)$$

Let $\mu_0$=permeability of free space and $\hat{a}_\varphi$=unit vector in azimuthal direction. A straightforward quasi-static analysis yields surface current density $\vec{J}(r)$ (A/m) as $$\vec{J}(r) = \frac{\omega\mu_0 H_0 \sigma\delta}{2(1+j)} r\hat{a}_\varphi \quad (2)$$

Figure 5C:
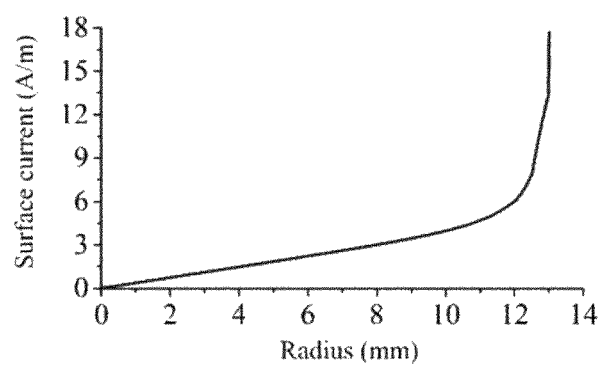
FIG. 5C shows a plot of surface current density as a function of radial distance from the center.

If the quasi-static assumption is removed, the variation of $\vec{J}(r)$ is no longer linear with r as in (2), but depicts a behavior where current tends to crowd around the periphery of the disk. The phenomenon is depicted in FIG. 5C showing a plot of $\vec{J}(r)$ obtained from a full wave EM simulation using CST software from Dassault Systems. The simulation uses a circular aluminum disk of diameter 26 mm and thickness 0.1 mm (501 in FIGS. 5A, 5B) placed in the xy-plane with center coinciding with the origin. The disk is illuminated by a rectangular four turn antenna of dimensions 30 mm×30 mm (601 in FIG. 6A) connected to a voltage source of nominal frequency 13.56 MHz and source impedance 50 ohms by assigning a discrete port in CST. The said excitation results in a current of ~111 mA through the antenna at the nominal frequency. The exciter antenna (Reader) is located parallel to the circular disk with its center at x=0, y=0, z=24 mm. It is to be noted that the assumption of uniform field to obtain (2) is removed in the simulation.

Figure 6A:
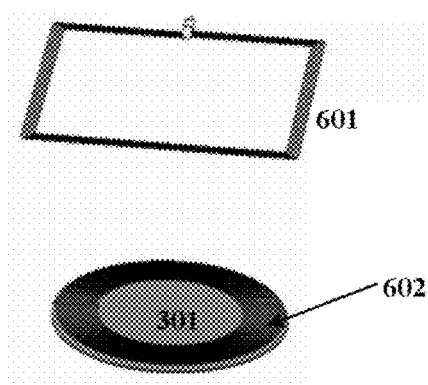
FIG. 6A shows a reader coil exciting the metal disk and Auxiliary coil.

Let's now introduce a coil, as per the present invention and designated the auxiliary Coil (Aux 602) in the vicinity of the metal disk as in FIG. 6A. For example, let Aux be a planar spiral with 11 turns and inner and outer diameters of 17 mm and 26 mm respectively, located parallel to the disk (and Reader) with its center at x=0, y=0, z=0.5 mm. A lumped capacitor (143 pF) is connected across the terminals of Aux to make it resonant at ~13.5 MHz in presence of the metal disk.

Figure 6B:
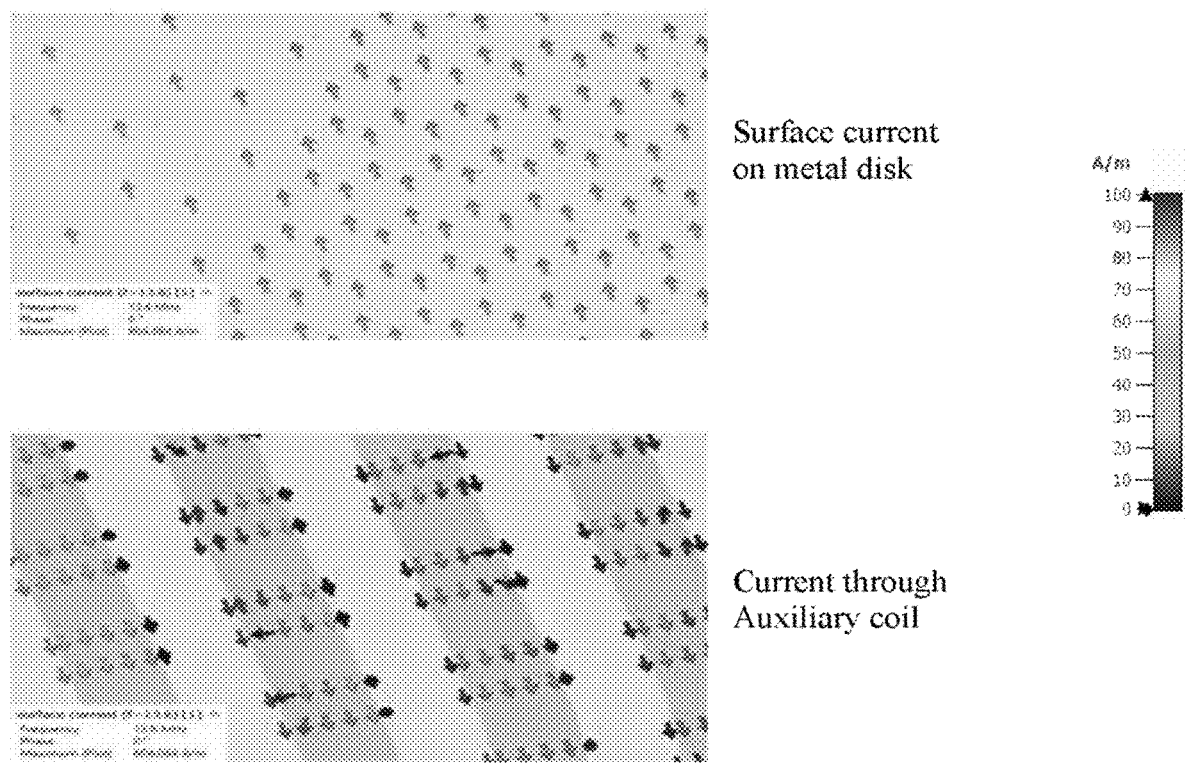
FIG. 6B shows opposing currents in metal disk and Auxiliary coil.

Just as the magnetic field from the Reader creates surface current on the metal disk, it also generates current on the Aux. A zoomed-in view of a part of the metal disk and Aux with four traces visible (metal underneath=lighter background, aux traces=four dark shaded patches) shown in FIG. 6B indicates the currents being in opposite directions. This is encouraging as it indicates the Aux potentially possesses a mechanism for counteracting the deleterious effect of surface (eddy) current in the metal disk. It is to be mentioned that the phase relation is not exactly 180 degrees but within few degrees of that, the deviation coming from the finite losses in the components.

Figure 7:
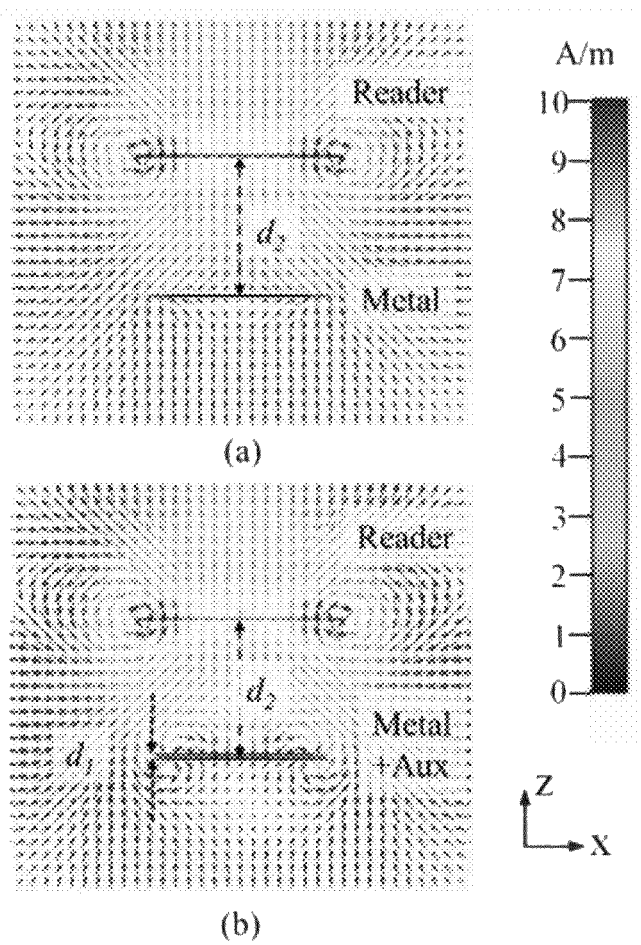
FIG. 7 shows magnetic field in transverse plane for (a) a Reader coil exciting a circular metal disk, and (b) a Reader coil exciting a circular metal disk co-located with an Auxiliary coil based resonator.

FIG. 7 shows the magnetic field in the xz-plane at y=0. The z-component of the magnetic field $H_z$ is responsible for inducing a voltage in an RFID device and is therefore of our interest. It can be observed from FIG. 7 that, in the absence of the Aux (marked (a)), $H_z$ is negligible in the vicinity of the metal. However, when Aux is introduced, significant $H_z$ is observed evidenced by the dark shaded arrows near Metal+Aux (marked (b)). In other words, the resultant magnetic flux has undergone an increase in magnitude compared to the scenario without Aux, and one can therefore expect improved performance of an RFID device in that region. In other words, Aux could potentially act as an effective shield against the metal disk.

Figure 8A:
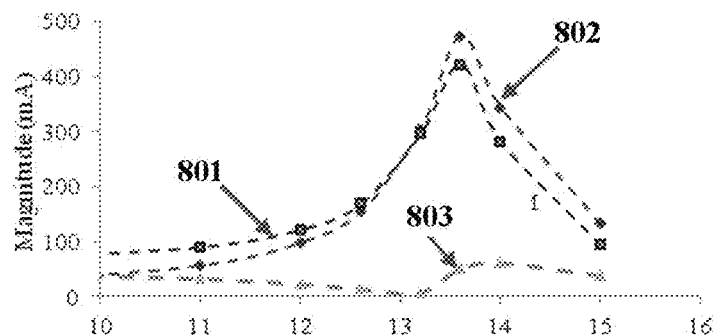
FIG. 8A shows a plot of scaled versions of magnetic flux for metal, Auxiliary coil and composite.
Figure 8B:
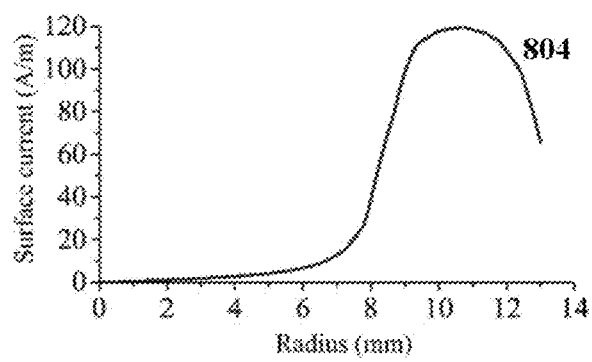
FIG. 8B shows a plot of surface current density as a function of radial distance from the center in presence of Auxiliary coil.

The flux generated by Aux is proportional to $N_2 I_2$ where $I_2$=current through Aux, $N_2$=number of turns in the Aux and plotted as 802 in FIG. 8A. The circular symmetry allows us to obtain the total surface current on the metal disk by integrating $\vec{J}(r)$ over a radius. FIG. 8B depicts the surface current density on metal 804 in presence of Aux resonated at 13.6 MHz with a discrete capacitor of 143 pF. Its difference from FIG. 5C is obvious in that most of the eddy current is occurring in the metal region directly under the Aux, instead of being crowded towards the periphery. Let this integrated surface current be $I_3$ plotted as 801 in FIG. 8A. The total flux due to the combined effect of Aux and metal disk will therefore be proportional to $N_2 I_2 + I_3$. The quantity $N_2 I_2 + I_3$ will be designated as figure of merit (FOM), and we would like its magnitude to be as high as possible. It is plotted as 803 in FIG. 8A.

It is observed that the magnitude of flux due to Aux 802 exceeds that due to metal in the vicinity of resonance (around 13.5 MHz here) resulting in favorable FOM and potential for shielding. Further, FOM is maximized around the resonant frequency, $f_{max}$. However, unlike broadband shielding provided by materials like ferrite, the shielding works over a limited band of frequencies only.

For $f << f_{max}$, the effect of Aux is negligible and therefore metal current 801 is greater than $|N_2 I_2|$ 802. As frequency is increased, Aux current keeps increasing at a rate faster that of the metal, till at a certain frequency $f_{min}$, the two fluxes viz. $|N_2 I_2|$ and $|I_3|$ becomes equal in magnitude. As the two currents are nominally in opposite phase (FIG. 6B), FOM reaches a minimum at this frequency rather than cancel out completely.

Importance of the z-component of the magnetic field $H_z$ can be highlighted from FIG. 7. To quantify its effects, the induced voltage in an open-circuited coil concentrically located with Aux and in the same xy-plane is determined next. The magnitude of the induced voltage is an indication of shielding effectiveness of the Aux. The coil consisting of 15 turns has an outer diameter of 16 mm and is therefore completely surrounded by the Aux.

Figure 8C:
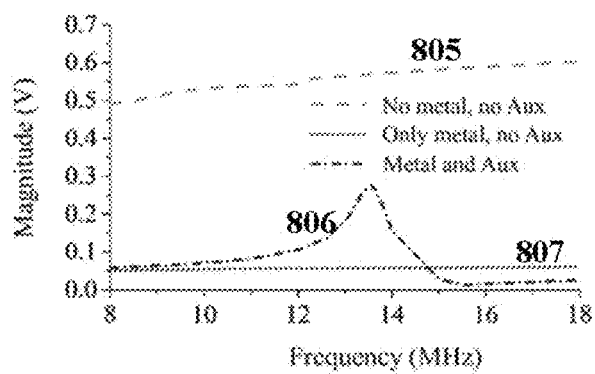
FIG. 8C shows shielding effectiveness under various scenarios.

Induced voltage is plotted as a function of frequency in FIG. 8C for three different scenarios. The upper bound of performance depicted by the plot 805, which is just the inner coil itself without any metal or Aux. The plot 807 shows the effect of metal without any Aux. As expected, the induced voltage is low indicating poor performance of an RFID device in the vicinity of metal. Finally, the plot 806 refers to the situation for the Aux being present that demonstrates its shielding effectiveness albeit over a limited bandwidth.

Going back the equivalent circuit model (FIG. 4), let
K=a scale factor with dimensions of inductance
L2=inductance of Aux 309
R2=resistance of Aux 311
N2=number of turns in L2 309
C2=capacitance 310 used to tune L2 309
L3=inductance of metal 305
R3=resistance of metal 306
$\omega_{op} = 2\pi f_{op}$ where $f_{op}$=operating frequency of the RFID Reader
$M_{23}$=Mutual inductance between L2 309 and L3 305
$k_{23}$=Magnetic coupling coefficient between L2 309 and L3 305

From the equivalent circuit model, $f_{max}$ and $f_{min}$ are approximately given by $$\omega_{max} = 2\pi f_{max} = \frac{1}{\sqrt{L_2(1-k_{23}^2)C_2}} \quad (3)$$

$$\omega_{min} = 2\pi f_{min} = \frac{1}{\sqrt{(L_2 + N_2^2 L_3 - 2N_2 M_{23})C_2}} \quad (4)$$

Occurrence of a maximum in the FOM at a frequency $f_{max}$ is observed in the plot 803 determined from EM simulation and by the equivalent circuit model as well. The $f_{max}$ should be located close to the operating frequency RFID Reader $f_{op}$. From the equivalent circuit of FIG. 4 it can be shown FOM reaches a maximum value $FOM_{op}$ given by $$FOM_{op} = \frac{KI_1}{L3}\left[1 + \frac{N_2^2 R_3}{R_2} + \frac{j\omega_{op}(k_{23}\sqrt{L_2} - N_2\sqrt{L_3})^2}{R_2}\right] \quad (5)$$

Figure 9A:
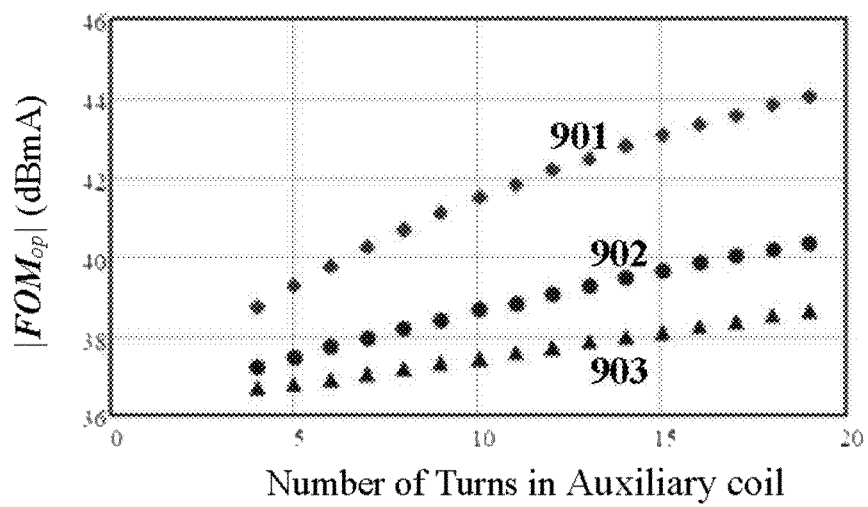
FIG. 9A shows a plot of Figure of merit as a function of number of turns in Auxiliary coil with resistance per turn as parameter.

From (5) it is observed that $|FOM_{op}|$ increases with decrease of $R_2$ and increase with $N_2$. This is depicted in FIG. 9A where the parameter in the plot is resistance per turn in Aux for values of 0.2 (901), 0.6 (902) and 1.0 (903) ohms/turn, respectively. In other words, the Quality (Q) Factor of the resonator should be high enough for adequate shielding action.

Figure 9B:
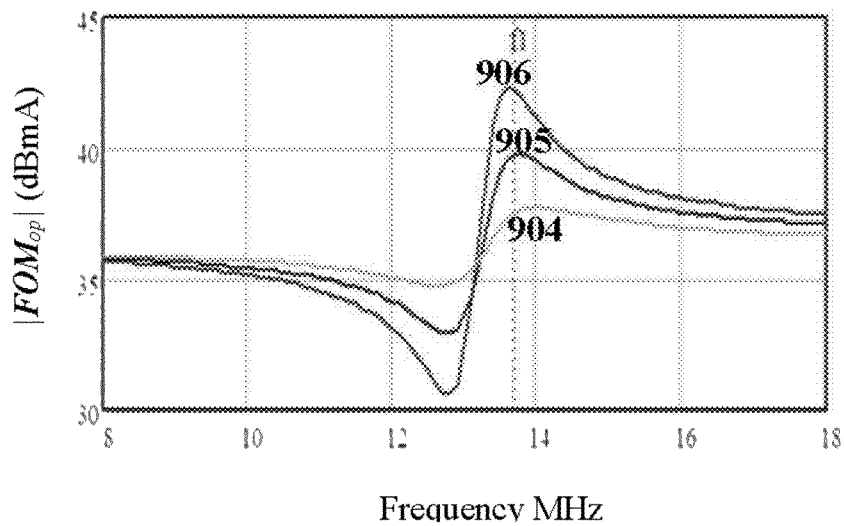
FIG. 9B shows a plot as a function of frequency with gap between metal and Auxiliary coil as parameter.

FIG. 9B shows the effect of gap ($d_1$ in mm) between Aux and metal disk calculated using the circuit model. It clearly indicates reduction in |FOM| as $d_1$ is reduced. To achieve this result, first full-wave simulation was carried out for Aux-metal gap values at 0.2 mm (904), 0.5 mm (905) and 0.7 mm (906) with direct excitation of Aux using a discrete port. Subsequently, $R_3$, $L_3$ and $k_{23}$ were determined using the circuit model describing the above simulation. Finally, the simulation results were verified against experimental data. It is found that $f_{max}$ and $f_{min}$ move closer if the Aux-metal gap is reduced, which brings the question if |FOM| vanishes for a low enough value of $d_1$. Now, if $L_2(1-k_{23}^2)=L_2+N^2L_3-2NM_{23}$, it is observed from (12a) and (12b) that $\omega_{max}$ becomes equal to $\omega_{min}$ resulting in a degenerate case. This situation occurs at a critical value of $k_{23}$ given by $$k_{23\_crit} = N_2\sqrt{\frac{L_3}{L_2}} \quad (6)$$

For the degenerate condition, the shielding property of Aux ceases to exist, and therefore operating value of $k_{23}$ should be sufficiently lower than this critical value. In other words, for shielding to be effective, the Aux-metal gap needs to exceed a critical value.

The description related to FIGS. 7 to 8C illustrated the shielding effect of a single coil against metal. In practice, however, both the Main Coil and the Auxiliary Coil interact magnetically with each other as well as with the metal foil.

Figure 10:
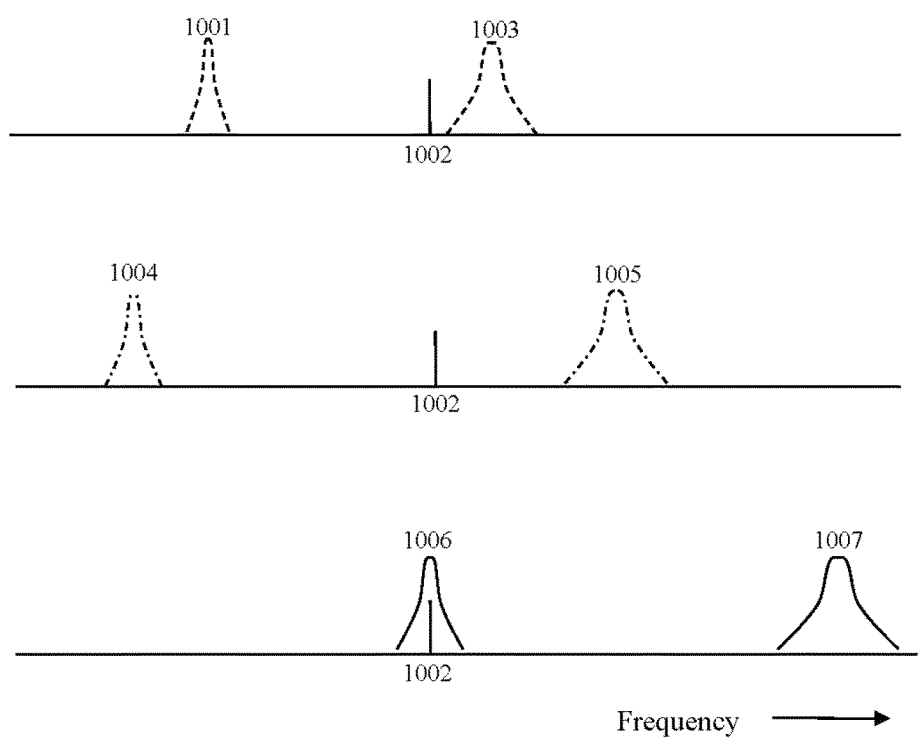
FIG. 10 depicts graphically the interaction between the Main and Auxiliary coils with each other and the Metal foil in frequency domain.

FIG. 10 depicts this interaction graphically, with the X-axis representing frequency (Not to scale). The operating frequency of the RFID Reader is represented by 1002, with 1001 and 1003 being the standalone resonant frequencies of the Auxiliary Coil and Main Coil, respectively.

Being magnetically coupled, the resonances of the composite system (i.e. comprising of both the Auxiliary Coil and Main Coil) undergo spectral splitting. This results in the lower resonance 1004 ('Odd mode') becoming lower than the standalone resonant frequency 1001 of the Auxiliary Coil, while the upper resonance frequency 1005 ('Even mode') becomes higher than the standalone resonant frequency 1003 of the Main Coil.

Once the composite antenna is brought in presence of the metal foil, both the resonant frequencies move up due to flow of eddy currents and reduction in magnetic flux, and in the process providing the shielding effect against metal as explained above.

The geometries of the Main Coil and the Auxiliary Coil, and their relative disposition (i.e. magnetic coupling) is so designed that the lower resonance 1006 is close to the operating frequency 1002 of the RFID Reader (e.g. smart phone). The upper resonance 1007 is substantially higher and need not be considered. Moreover, being the so-called 'Even Mode', it does not assist in enhancing the read range by the Auxiliary Coil.

Figure 11:
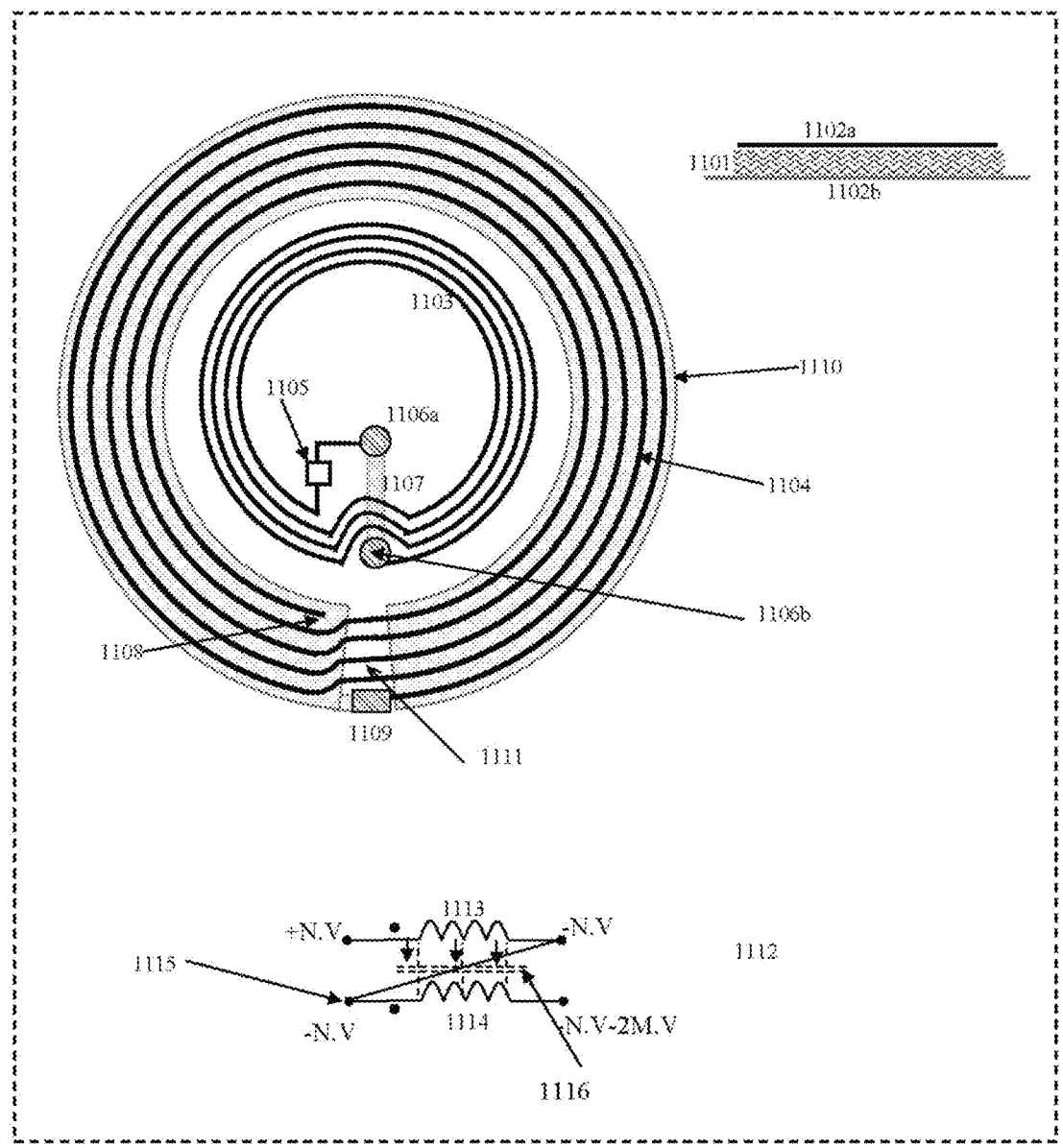
FIG. 11 depicts an embodiment of a planar antenna that enables the RFID to operate in Induction Sealing environment.

FIG. 11 shows one embodiment of the partitioned antenna as described with reference to FIGS. 2A and 2B suitable for Induction Sealing environment. The drawing is a representative one only and not to scale. Parameters such as number of turns, trace width, spacing between traces etc. are for illustration only. The antenna being planar in structure can be constructed as metal 1102a, 1102b (e.g. Copper, Aluminum) deposited on or etched away from a flexible dielectric substrate 1101 such as PET, polyimide etc. 1102a is designated as top layer, whereas 1102b as the bottom layer. The shapes though being depicted circular are not limited to that geometry, and in general can assume the shape of any irregular polygon.

The top layer consists of two spirals, a smaller inner spiral 1103 and a larger outer spiral 1104, which are not connected electrically. In other words, inner spiral 1103 and outer spiral 1104 are coupled magnetically when current is flowing through them. The semiconductor chip 1105 used in the RFID is connected to terminals of the smaller inner spiral 1103 by utilizing vias 1106a, 1106b and a trace 1107 in the bottom layer. Following the nomenclature described earlier, the inner spiral 1103 and its associates thus constitute the Main Coil.

The larger outer spiral 1104, created on the top layer, has one terminal 1108 open. The other terminal is connected to a via 1109 that connects to a metallic annular structure 1110 in the bottom layer. The annular structure 1110 is not electrically closed to prevent flow of local eddy currents, which is ensured by the gap 1111. There exists significant parasitic capacitance between spiral 1104 and annular structure 1110 that makes the composite structure (consisting of 1104 and 1110) work as an electrical resonator. Following the nomenclature described earlier, the outer spiral 1104 and its associates thus constitute the Auxiliary Coil.

The resonant frequency 1001 (FIG. 10) of this resonator (by itself) is designed to be somewhat lower than the operating frequency 1002 of the RFID Reader (e.g. smart phone) typically at 13.56 MHz. The smaller inner spiral 1103 in conjunction with the capacitance of the semiconductor chip 1105 resonate at a frequency 1003 in the proximity of operating frequency 1002 of the RFID Reader (e.g. smart phone).

An equivalent circuit 1112 depicts the representation of the Aux coil 1104 by a lumped inductor 1113, and the annular structure 1110 by another lumped inductor 1114. Connection of 1104 with 1110 using via 1109 is shown in 1112 as the cross-coupled connection 1115. Let N and M be the number of turns in the top and bottom layers of the Auxiliary Coil (in FIG. 11, M is shown as unity). The voltage induced in the top layer 1113 is 2N.V, whereas that in bottom layer 1114 is 2M.V. The voltages developed at various points are shown in 1112. Connecting opposite terminals of inductors 1113 and 1114 maximizes capacitive current through the parasitic capacitance 1116 as well the inductance, and is therefore the preferred connection method.

The outer resonator formed around the Auxiliary Coil performs the important task of shielding the metal foil 103 by generating a magnetic field that more than compensates for the deleterious magnetic field generated due to eddy currents in 103, as explained with reference to FIGS. 6A to 8C. Apart from this shielding effect, by virtue of magnetic coupling between Main and Aux coils, the Aux assists in transferring power received from Reader 601 to the Main Coil where the semiconductor chip 1105 is connected. In other words, the Auxiliary Coil assists the Main Coil for proper RFID operation, providing acceptable read range even in presence of the foil 103.

The Auxiliary Coil, however, plays a negligible role when the Induction Sealing apparatus is operational. This is because, at such low frequencies (tens of KHz), the Auxiliary Coil is essentially open and negligible current flows through it. Thus the unintentional voltage induced by Induction Sealing is predominantly due to the Main Coil 201. Being significantly smaller in area compared to the overall RFID, the unintentional voltage is reduced considerably (induced voltage being proportional to the effective area for calculating the magnetic flux).

Figure 12:
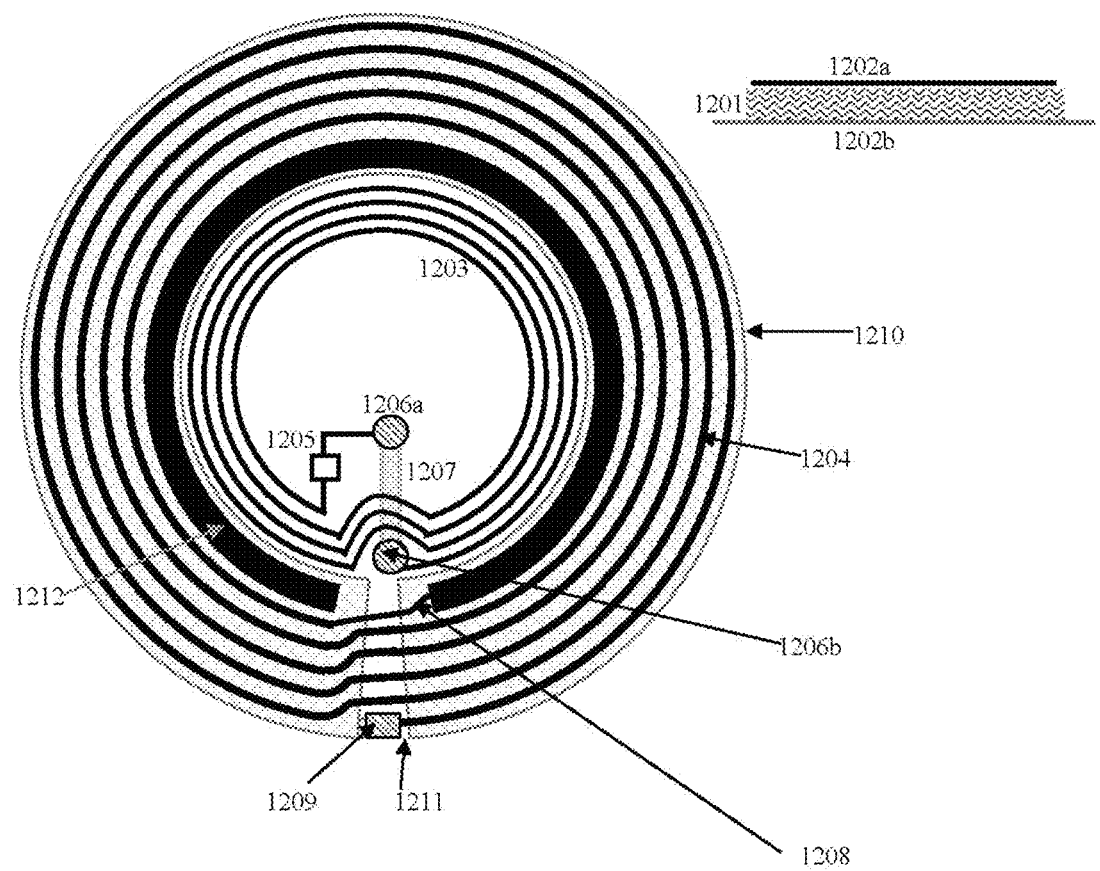
FIG. 12 depicts an alternative embodiment of a planar antenna that enables the RFID to operate in Induction Sealing environment.

FIG. 12 depicts an alternative embodiment to that of FIG. 11, where the annular structure occupies both top and bottom layers. As in FIG. 11, the antenna is planar in structure and constructed with metal layers 1202a, 1202b deposited on or etched away from a flexible dielectric substrate 1201, 1202a is designated as top layer, whereas 1202b is designated as the bottom layer. The smaller inner spiral 1203 (Main Coil) and the larger outer spiral 1204 (Auxiliary Coil) are not connected electrically as in FIG. 11. In other words, spirals 1203 and 1204 are coupled magnetically when current is flowing through them. The semiconductor chip 1205 used in the RFID is connected to terminals of the smaller inner spiral 1203 by utilizing vias 1206a, 1206b and a trace 1207 in the bottom layer.

The larger outer spiral 1204 (Auxiliary Coil), created on the top layer, has one terminal 1208 connected to a top layer annular structure 1212. The other terminal is connected to a via 1209 that connects to an annular structure 1210 in the bottom layer. Neither of the annular structures 1210 and 1212 are closed electrically to prevent the flow of local eddy currents, as ensured by the gap 1211 with regards to 1210. Thus, there exists significant parasitic capacitance between spiral 1204 and annular structure 1210 as in FIG. 11. Additional parasitic capacitance is introduced by the top layer annular structure 1212 that makes the composite structure (consisting of 1204,1210 and 1212) work as an electrical resonator. The resonant frequency 1001 (FIG. 10) of this resonator (by itself) is designed to be somewhat lower than the operating frequency 1002 of the RFID Reader (e.g. smart phone).

Figure 13:
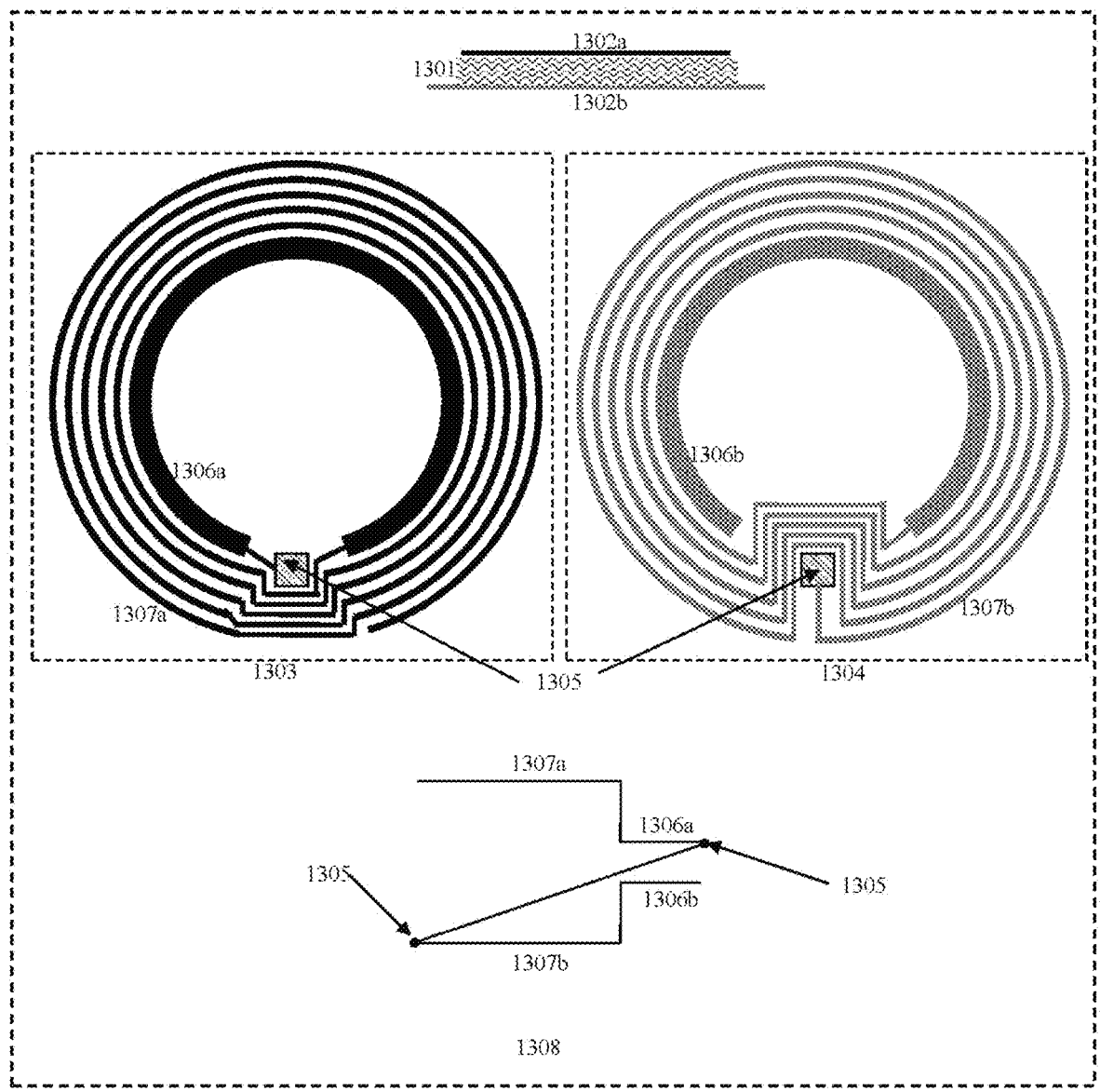
FIG. 13 depicts another alternative embodiment of a planar antenna that enables the RFID to operate in Induction Sealing environment.

FIG. 13 depicts an alternative embodiment of Auxiliary Coil where it can be conceived as cross-connected open circuited transmission line possessing non-uniform characteristic impedance.

The Main Coil is implied and therefore not shown. As in FIG. 11 and FIG. 12, the antenna is planar in structure and constructed with metal layers 1302a, 1302b deposited on or etched away from a flexible dielectric substrate 1301, 1302a is designated as top layer, whereas 1302b is designated as the bottom layer. A planar spiral 1303 is situated in the top layer 1302a, whereas another spiral 1304 is situated in the bottom layer 1302b. The spirals 1303 and 1304 are almost identical except in the region around the via 1305 that helps to cross-connect the composite transmission line. 1306a in top layer and 1306b in the bottom layer (shown as a relatively wide trace with single turn, but not limited to a single turn) constitute a transmission line with relatively low characteristic impedance. 1307a in top layer and 1307b in the bottom layer (shown as a relatively narrow trace with five turns, but not limited to that many turns) constitute a transmission line with relatively high characteristic impedance. The spirals 1303 and 1304 can be aligned perfectly but can be offset as well.

1308 depicts an equivalent circuit consisting of transmission lines of low and high characteristic impedance, formed by arms 1306a, 1306b and 1307a, 1307b respectively. The cross-connect via 1305 is also depicted.

The invention claimed is:

1. A Radio Frequency Identification Device (RFID) tag operable under induction sealing arrangement and withstand electrical stress from induction sealing comprising
   antenna coil partitioned into a main coil and an auxiliary coil;
   said main coil and said auxiliary coil are collocated on two separate overlapping or non-overlapping regions of a dielectric substrate without any galvanic connection therebetween;
   said main coil is operatively connected with an RFID semiconductor chip disposed on said dielectric substrate and said auxiliary coil operates as a resonator tuned to a certain resonating frequency that enables the auxiliary coil to act as a virtual open circuit to induction sealing frequencies and help the semiconductor chip to withstand the electrical stress from induction sealing;
   said auxiliary coil carries a current during interrogation of the tag by an RFID Reader which provides shielding against eddy currents on metallic seal used for the induction sealing.

2. The RFID tag as claimed in claim 1, wherein the antenna coil is a planar or a non-planar coil and it is provided within the cavity of a cap of a container preferably between wad and inside of the cap before induction heating-based sealing.

3. The RFID tag as claimed in claim 1, wherein magnetic field generated by induction sealer during the induction heating based sealing induces voltage in the main coil across its terminals and by limiting area and number of turns in the main coil, the voltage induced between terminals is maintained within safe limits for operation of the semiconductor chip, whereby the magnetic field also induces voltage in the auxiliary coil which is connected to a distributed or lumped capacitor for forming the resonator, said resonator resonates in vicinity of RFID reader operating frequency and therefore act as the virtual open circuit to the induction sealing frequencies resulting negligible current flows in the auxiliary coil during the induction sealing process and hence negligible effect on the main coil.

4. The RFID tag as claimed in claim 1, wherein the auxiliary coil and the main coil are magnetically coupled, whereby resonances of the composite antenna comprising of both the auxiliary coil and the main coil undergo spectral splitting which results in a resonance frequency which is lower than standalone resonant frequency of the main or auxiliary coil, and another resonance frequency higher than the standalone resonant frequency of the main or auxiliary coil and once the composite antenna is brought in presence of the metallic seal which is a metal foil, both the resonant frequencies move up due to flow of the eddy currents and reduction in magnetic flux, and their relative disposition is so designed that lower of the resonance frequencies is close to operating frequency of the RFID Reader.

5. The RFID tag as claimed in claim 1, wherein the currents in the auxiliary coil and the eddy current in the metal foil are in opposite phase and hence magnetic flux from one opposes the other, whereby the auxiliary coil can be so designed in regards to its losses and number of turns as to more than compensate the deleterious effect of magnetic flux from the eddy current in the metal foil and in the process to provide shielding against the metal foil in the vicinity.

6. The RFID tag as claimed in claim 1, wherein the antenna coil is constructed as metal coil deposited on or etched away from the dielectric substrate as a top layer and a bottom layer;
   wherein said top layer preferably consists of two spirals, a smaller inner spiral and a larger outer spiral, which are not connected electrically but configured to be coupled magnetically when current is flowing through them;
   wherein the semiconductor chip is connected to terminals of the smaller inner spiral by utilizing vias and a trace in the bottom layer, whereby said smaller inner spiral and elements connected to that smaller inner spiral constitute the main coil; and
   wherein the larger outer spiral includes an open terminal and other terminal is connected to a via that connects to an annular structure in the bottom layer, said annular structure is not electrically closed to prevent flow of local eddy currents, which is ensured by a gap and thus there exists a parasitic capacitance between larger outer spiral and the annular structure that makes the composite structure work as the electrical resonator, whereby the larger outer spiral and elements connected to that larger outer spiral constitute the auxiliary coil.

7. The RFID tag as claimed in claim 6, wherein resonant frequencies of the larger outer spiral and associated circuitry, and the smaller inner spiral in conjunction with capacitance of the semiconductor chip is designed to be lower than operating frequency of RFID Reader such that in presence of metal the lower of the resonance frequencies of the composite is in the proximity of the operating frequency of the RFID Reader.

8. The RFID tag as claimed in claim 6, wherein the auxiliary coil shield the metal foil by mechanism described in claim 5 and collects power from the Reader and transfers additional power to the semiconductor chip connected to the main coil by virtue of magnetic coupling.

9. The RFID tag as claimed in claim 6, wherein the annular structure occupies both the top and the bottom layers, whereby another annular structure induce additional parasitic capacitance which that makes composite structure consisting of the auxiliary coil, the annular structure and the another annular structure to work as an electrical resonator.

10. The RFID tag as claimed in claim 1, wherein the auxiliary coil includes cross-connected open circuited transmission line possessing non-uniform characteristic impedance and the main coil is implied.

11. The RFID tag as claimed in claim 10, wherein two metal layers are deposited on or etched away from the dielectric substrate, whereby one of the metal layers is designated as top layer whereas other of the metal layers is designated as the bottom layer;
   wherein a planar first spiral is situated in the top layer whereas another second spiral is situated in the bottom layer;
   wherein the first and the second spirals are identical except in region around via that helps to cross-connect the composite transmission line;
   wherein relatively wide conductors in the top and bottom layers constitute the transmission line with relatively low characteristic impedance; and
   wherein relatively narrow conductors in the top and bottom layers constitute the transmission line with relatively high characteristic impedance.

12. The RFID tag as claimed in claim 11, wherein the spirals are aligned perfectly or includes an offset as well.

13. The RFID tag as claimed in claim 1, wherein the tag operates as a shield against presence of metal in its vicinity irrespective of use in induction sealing or not.

14. The Auxiliary coil as claimed in claim 1, wherein the Auxiliary coil operates in conjunction with a RFID Reader antenna operating in proximity to metal, to extend the read range of the Reader.

* * * * *